United States Patent
Lu et al.

(10) Patent No.: US 11,343,233 B2
(45) Date of Patent: May 24, 2022

(54) NODE CONTROL METHOD AND RELATED APPARATUS IN DISTRIBUTED SYSTEM

(71) Applicant: Tencent Technology (Shenzhen) Company Limited, Shenzhen (CN)

(72) Inventors: Jiguang Lu, Shenzhen (CN); Jianjun Zhang, Shenzhen (CN); Shicheng Feng, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/146,217

(22) Filed: Jan. 11, 2021

(65) Prior Publication Data

US 2021/0136046 A1   May 6, 2021

Related U.S. Application Data

(63) Continuation of application No. PCT/CN2020/075002, filed on Feb. 13, 2020.

(30) Foreign Application Priority Data

Feb. 15, 2019   (CN) .................. 201910117285.X

(51) Int. Cl.
*H04L 29/06*   (2006.01)
*H04L 61/4511*   (2022.01)
*H04L 67/10*   (2022.01)

(52) U.S. Cl.
CPC ...... *H04L 63/0428* (2013.01); *H04L 61/1511* (2013.01); *H04L 67/10* (2013.01)

(58) Field of Classification Search
CPC ... H04L 63/0428; H04L 61/1511; H04L 67/10
See application file for complete search history.

(56) References Cited

U.S. PATENT DOCUMENTS

| | | | |
|---|---|---|---|
| 10,708,379 B1* | 7/2020 | Gupta | ............ G06F 16/245 |
| 2006/0075114 A1* | 4/2006 | Panasyuk | ........... H04L 67/288 |
| | | | 709/227 |
| 2016/0285871 A1 | 9/2016 | Chathoth et al. | |

FOREIGN PATENT DOCUMENTS

| | | |
|---|---|---|
| CN | 102118448 A | 7/2011 |
| CN | 102497280 A | 6/2012 |

(Continued)

OTHER PUBLICATIONS

Tencent Technology, ISR, PCT/CN2020/075002, Apr. 26, 2020, 2 pgs.

(Continued)

*Primary Examiner* — Cheikh T Ndiaye
(74) *Attorney, Agent, or Firm* — Morgan, Lewis & Bockius LLP

(57) ABSTRACT

An embodiment of this application discloses a node control method performed by a forwarding platform in a distributed computer system. The method includes: establishing, by a forwarding platform, a secure link with a user terminal through a domain name of the forwarding platform; obtaining, by the forwarding platform through the secure link, a request packet transmitted by a user terminal, and the request packet comprising an address identifier of a target node in the distributed computer system and a request content of the user terminal for the target node; encrypting, by the forwarding platform, the request content to obtain a first encrypted packet; and transmitting, by the forwarding platform, the first encrypted packet to the target node according to the address identifier. Computing device and non-transitory computer-readable storage medium counterparts are also contemplated.

20 Claims, 7 Drawing Sheets

(56) References Cited

FOREIGN PATENT DOCUMENTS

| | | |
|---|---|---|
| CN | 102571948 A | 7/2012 |
| CN | 102801812 A | 11/2012 |
| CN | 103095783 A | 5/2013 |
| CN | 103458055 A | 12/2013 |
| CN | 104202307 A | 12/2014 |
| CN | 104967590 A | 10/2015 |
| CN | 105656995 A | 6/2016 |
| CN | 107707943 A | 2/2018 |
| CN | 107770138 A | 3/2018 |
| CN | 109313577 A | 2/2019 |
| CN | 109905380 A | 6/2019 |
| WO | WO 2005083959 A1 | 9/2005 |
| WO | WO 2007103594 B1 | 3/2008 |

OTHER PUBLICATIONS

Tencent Technology, WO, PCT/CN2020/075002, Apr. 26, 2020, 5 pgs.
Tencent Technology, IPRP, PCT/CN2020/075002, Aug. 10, 2021, 6 pgs.

* cited by examiner

NODE CONTROL METHOD AND RELATED
APPARATUS IN DISTRIBUTED SYSTEM

CROSS REFERENCE TO RELATED
APPLICATIONS

This application is a continuation application of PCT Patent Application No. PCT/CN2020/075002, entitled "CONTROL METHOD FOR NODES IN DISTRIBUTED SYSTEM AND RELATED DEVICE" filed on Feb. 13, 2020, which claims priority to Chinese Patent Application No. 201910117285.X, filed with the State Intellectual Property Office of the People's Republic of China on Feb. 15, 2019, and entitled "NODE CONTROL METHOD AND RELATED APPARATUS IN DISTRIBUTED SYSTEM", all of which are incorporated herein by reference in their entirety.

FIELD OF THE TECHNOLOGY

This application relates to the field of data processing, and in particular, to a node control method and a related apparatus in a distributed computer system.

BACKGROUND OF THE DISCLOSURE

A distributed computer system is a processing system established on a network, and includes a plurality of nodes, and any one node may be a computer, a server, a cluster or the like. In some application scenarios, a user has a requirement of individually performing connection control on different nodes in the distributed computer system through a terminal. To ensure security of the distributed computer system, the terminal used by the user needs to establish a secure link with a node in a connection control process.

In a conventional manner, a corresponding domain name is allocated to each node in the distributed computer system, and the terminal used by the user may establish, in a manner of accessing a node through a domain name, a secure link conforming to a security protocol such as the Hypertext Transfer Protocol Secure (HTTPS) with the accessed node, thereby enhancing security in the connection control process.

However, there are a large quantity of nodes in the distributed computer system, and allocating a different domain name to each node causes very high domain name maintenance costs, which is unfavorable to application of the distributed computer system.

SUMMARY

To resolve the foregoing technical problem, embodiments of this application provide a node control method and a related apparatus in a distributed computer system, thereby implementing connection control on any node in the distributed computer system only in need of maintaining a domain name of a forwarding platform, and reducing maintenance costs and saving network resources while ensuring security, to facilitate application of the distributed computer system.

The embodiments of this application disclose the following technical solutions:

According to an aspect, an embodiment of this application provides a node control method in a distributed computer system, including:

establishing, by a forwarding platform, a secure link with a user terminal through a domain name of the forwarding platform;

obtaining, by the forwarding platform through the secure link, a request packet transmitted by a user terminal, and the request packet comprising an address identifier of a target node in the distributed computer system and a request content of the user terminal for the target node;

encrypting, by the forwarding platform, the request content to obtain a first encrypted packet; and transmitting, by the forwarding platform, the first encrypted packet to the target node according to the address identifier.

According to an aspect, an embodiment of this application provides a node control apparatus in a distributed computer system, including a first obtaining unit, an encryption unit, and a transmission unit, the first obtaining unit being configured to establish a secure link with a user terminal; obtain, through the secure link, a request packet transmitted by the user terminal, the request packet including an address identifier of a target node in the distributed computer system and a request content of the user terminal for the target node;

the encryption unit being configured to encrypt the request content to obtain a first encrypted packet; and the transmission unit being configured to transmit the first encrypted packet to the target node according to the address identifier.

According to an aspect, an embodiment of this application provides a node control method in a distributed computer system, including:

transmitting, by a user terminal, a request packet to a forwarding platform through a secure link, the secure link being established between the user terminal and the forwarding platform through a domain name of the forwarding platform, and the request packet including an address identifier of a target node in the distributed computer system and a request content of the user terminal for the target node; and obtaining, by the user terminal through the secure link, a request result returned by the forwarding platform, the request result being obtained by the target node in response to the request content.

According to an aspect, an embodiment of this application provides a node control apparatus in a distributed computer system, including a first transmission unit and an obtaining unit, the first transmission unit being configured to transmit a request packet to a forwarding platform through a secure link, the secure link being established between the apparatus and the forwarding platform through a domain name of the forwarding platform, and the request packet including an address identifier of a target node in the distributed computer system and a request content of the apparatus for the target node; and the obtaining unit being configured to obtain, through the secure link, a request result returned by the forwarding platform, the request result being obtained by the target node in response to the request content.

According to an aspect, an embodiment of this application provides a node control method in a distributed computer system, applied to a target node in the distributed computer system, the method including:

obtaining, by the target node, a first encrypted packet transmitted by a forwarding platform, the first encrypted packet being obtained by encrypting a request content by the forwarding platform, and the request content being carried in a request packet transmitted by a user terminal through a secure link between the user terminal and the forwarding platform; and decrypting, by the target node, the first encrypted packet to obtain the request content.

According to an aspect, an embodiment of this application provides a node control apparatus in a distributed computer system, including a first obtaining unit and a decryption unit, the first obtaining unit being configured to obtain a first encrypted packet transmitted by a forwarding platform, the first encrypted packet being obtained by encrypting a request content by the forwarding platform, and the request content being carried in a request packet transmitted by a user terminal through a secure link between the user terminal and the forwarding platform; and the decryption unit being configured to decrypt the first encrypted packet to obtain the request content.

According to an aspect, an embodiment of this application provides a computing device acting as a forwarding platform used in a distributed computer system, including a processor and a memory, the memory being configured to store program code and transmit the program code to the processor; and the processor being configured to perform the node control method in a distributed computer system according to one of the foregoing aspects according to instructions in the program code.

According to an aspect, an embodiment of this application provides a non-transitory computer-readable storage medium, configured to store program code, the program code implementing, when executed by one or more processors, the node control method in a distributed computer system according to the foregoing embodiment of this application.

It may be seen from the foregoing technical solutions that, if a user terminal needs to perform connection control on a target node in a distributed computer system, the user terminal may establish a secure link through a domain name of a forwarding platform, and transmit a request packet to the forwarding platform from the secure link, where the request packet includes an address identifier of the target node and a request content of the user terminal for the target node. After obtaining the request packet, the forwarding platform may determine, according to the address identifier, the target node, in the distributed computer system, that needs to receive the request content; and encrypt the request content and transmit the encrypted request content to the target node. Encrypted secure transmission is used between the forwarding platform and a node in the distributed computer system. Therefore, when any user terminal performs connection control on the node in the distributed computer system, security can be ensured provided that the user terminal establishes a secure link with the forwarding platform through a domain name of the forwarding platform, thereby implementing connection control on any node in the distributed computer system only in need of maintaining the domain name of the forwarding platform, and reducing maintenance costs and saving network resources while ensuring security, to facilitate application of the distributed computer system.

BRIEF DESCRIPTION OF THE DRAWINGS

To describe the technical solutions of the embodiments of this application or the related art more clearly, the accompanying drawings required for describing the embodiments or the related art are briefly introduced below. Apparently, the accompanying drawings in the following description show merely some embodiments of this application, and a person of ordinary skill in the art may still derive other drawings from these accompanying drawings without creative efforts.

DESCRIPTION OF EMBODIMENTS

The following describes embodiments of this application with reference to the accompanying drawings.

For nodes in a distributed computer system, in a conventional node control method, to implement a secure link, a corresponding domain name used for establishing the secure link is allocated to each node. There are a large quantity of nodes in the distributed computer system. Consequently, domain name maintenance costs are very high, which is unfavorable to application of the distributed computer system.

To resolve the foregoing technical problem, an embodiment of this application provides a node control method in a distributed computer system. In the method, a secure link between a user terminal and a forwarding platform is established through a domain name of the forwarding platform, and encrypted secure transmission is used between the forwarding platform and a node in the distributed computer system. Therefore, when any user terminal performs connection control on the node in the distributed computer system, security can be ensured provided that the user terminal establishes a secure link with the forwarding platform through a domain name of the forwarding platform in no need of allocating a corresponding domain name to each node, thereby implementing connection control on any node in the distributed computer system only in need of maintaining the domain name of the forwarding platform. In this application, the forwarding platform is also known as a blockchain-as-a-service (BaaS) platform.

The forwarding platform may be deployed on a server or a terminal device. The terminal device may be specifically a computer, a mobile terminal, a tablet computer or the like; and the server may be specifically an independent server, or may be a cluster server.

Figure 1:
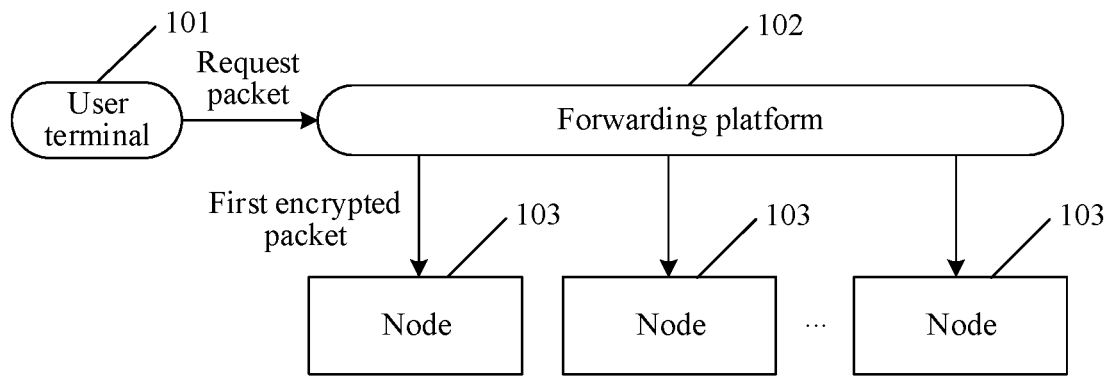
FIG. 1 is an exemplary diagram of a system architecture to which a node control method in a distributed computer system is applicable according to an embodiment of this application.

The method provided in this embodiment of this application may be applied to a system architecture shown in FIG. 1, and the system architecture includes a user terminal 101, a forwarding platform 102 and a plurality of nodes 103 in the distributed computer system. The user terminal 101 may be a computer, a mobile terminal, a tablet computer or the like; and the node 103 is a device providing a service to the user terminal 101, and the node 103 may be, for example, a computer, a server or a cluster.

When the user terminal 101 needs to perform connection control on any node 103 in the distributed computer system, for example, a target node, the user terminal 101 transmits a request packet to the forwarding platform 102 through a secure link. The secure link is a link conforming to a security protocol such as the HTTPS protocol, and security of a connection control process may be enhanced through the secure link. In this embodiment, the secure link is established through a domain name of the forwarding platform 102, thereby ensuring security of transmitting the request packet to the forwarding platform 102 by the user terminal 101. The domain name of the forwarding platform 102 may include a plurality of forms, and may be, for example, www.baas.qq.com.

The request packet is a packet generated when the user terminal 101 needs to perform control on the target node, and the control performed by the user terminal 101 on the target node may be, for example, login, registration, or downloading of a picture or document. An operation of a user on the user terminal 101 may trigger the user terminal 101 to generate a request packet. For example, when the user clicks a "please log in" button on a web page on the user terminal 101, the user terminal 101 may generate a corresponding request packet, where the request packet is used for requesting to log in to a page.

The request packet includes an address identifier of the target node and a request content of the user terminal for the target node. The address identifier is used for identifying a node that the user terminal 101 needs to access, and the forwarding platform 102 may determine, according to the address identifier, the target node, in the distributed computer system, that needs to receive the request content; and encrypt the request content to obtain a first encrypted packet and transmit the first encrypted packet to the target node. The request content is a type of descriptive information, used for describing the control performed by the user terminal 101 on the target node. For example, the user enters a user name and a password on a web page on the user terminal 101 provided by the target node, and clicks a "log in" button, thereby triggering the user terminal 101 to generate a corresponding request packet. In this case, the request content may include the user name and the password. The target node can learn, according to the request content, how to respond to the request packet transmitted by the user terminal 101.

Therefore, it can be seen that, in a process that the user terminal 101 performs control on any node 103, security exists between the user terminal 101 and the forwarding platform 102, and security also exists between the forwarding platform 102 and the node 103, thereby ensuring security in the node control process; and only one domain name is required.

Next, separately from the perspectives of performing interaction among the forwarding platform, the user terminal, and the target node, the node control method in a distributed computer system provided in this embodiment of this application is described.

Figure 2:
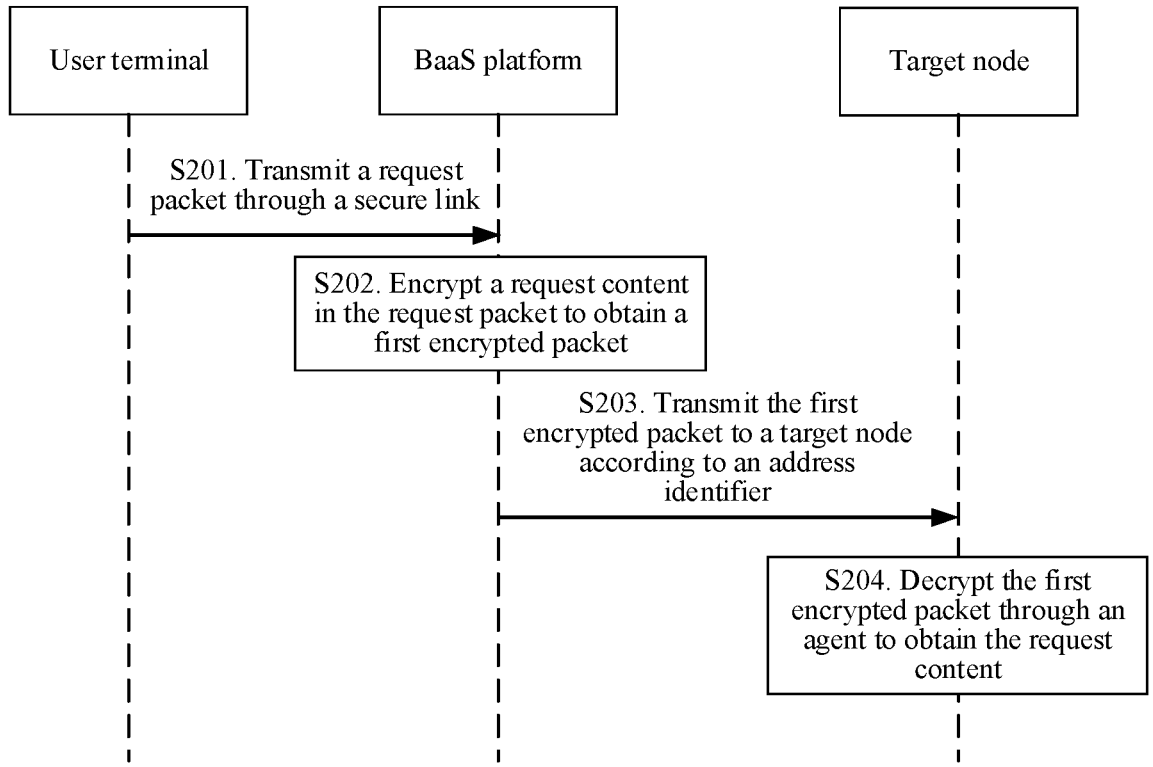
FIG. 2 is a signaling interaction diagram of a node control method in a distributed computer system according to an embodiment of this application.

Referring to FIG. 2, the method includes the following steps:

Step S201. A user terminal transmits a request packet to a forwarding platform through a secure link.

The forwarding platform has a domain name, and the terminal first establishes the secure link with the forwarding platform through the domain name of the forwarding platform. In this way, the forwarding platform may obtain, through the secure link, the request packet transmitted by the user terminal, thereby ensuring security of interaction between the user terminal and the forwarding platform.

It may be understood that, an address identifier included in the request packet may exist in the request packet in any form. In a possible implementation, the address identifier is carried in a uniform resource locator (URL) including the domain name. Specifically, the URL may be in the form of domain name+address identifier. In this way, after obtaining the request packet, the forwarding platform may determine, according to whether a domain name in a URL and the domain name of the forwarding platform are consistent, whether the request packet is transmitted incorrectly, that is, determine whether the request packet is a packet supposed to be transmitted to the forwarding platform. If the domain name in the URL and the domain name of the forwarding platform are consistent, the forwarding platform determines that the request packet is transmitted correctly, and the forwarding platform may perform a subsequent operation on the request packet; otherwise, the forwarding platform determines that the request packet is transmitted incorrectly, and the forwarding platform may discard the request packet, to avoid performing an unnecessary operation on the request packet.

For example, a URL is www.baas.qq.com/192.168.10.11, where www.baas.qq.com is a domain name, and 192.168.10.11 is an address identifier. Through pre-negotiation between the user terminal and the forwarding platform, a part of the URL representing the domain name and a part representing the address identifier may be defined. In this way, the forwarding platform may identify the domain name www.baas.qq.com from the URL, and then determine, according to whether www.baas.qq.com and the domain name of the forwarding platform are consistent, whether the request packet is transmitted incorrectly.

Step S202. The forwarding platform encrypts the request content to obtain a first encrypted packet.

The forwarding platform may parse the request packet to obtain the request content and the address identifier. To ensure security of forwarding the request content to the target node by the forwarding platform, to prevent the request content forwarded by the forwarding platform to the target node from being tampered with, the forwarding platform may encrypt the request content to obtain the first encrypted packet, and then transmit the first encrypted packet to the target node.

In this embodiment of this application, the distributed computer system includes many nodes, and the user terminal may not have permission to access all of the nodes, or may have permission to access only one or some of the nodes, or even does not have permission to access any node. To prevent a user terminal not having permission to access the target node from accessing the target node, and then prevent an unauthorized user from attaching the target node through the user terminal, in this embodiment, the request packet may further include a user identifier of the user terminal, and the user identifier is used for identifying a permission relationship between the user terminal and the target node.

In this way, before step S202 is performed, the forwarding platform may determine whether the user identifier in the request packet has permission to access the target node. When determining that the user identifier in the request packet has the permission to access the target node, step S202 is performed; and if not, the forwarding platform discards the request packet.

In a possible implementation, a manner in which the forwarding platform determines whether the user identifier has permission to access the target node is: for each node in the distributed computer system, the forwarding platform separately records a correspondence between the each node and a user identifier having permission to access the node, the correspondence includes a relationship between an address identifier of a node and a user identifier having permission to access the node, and the correspondence embodies that a user identifier has permission to access a node. Therefore, after the forwarding platform obtains the request packet, if a correspondence between the user identifier and the address identifier that are included in the request packet matches a correspondence recorded in the forwarding platform, it may be determined that the user identifier has permission to access the target node; otherwise, it may be determined that the user identifier does not have the permission to access the target node.

By performing authentication on the permission of the user terminal, an unauthorized user may be prevented from attacking the target node through the user terminal, thereby improving security of nodes.

Step S203. The forwarding platform transmits the first encrypted packet to the target node according to the address identifier.

The forwarding platform determines the target node according to the address identifier obtained through parsing, and then transmits the first encrypted packet to the target node, to help the target node respond to the request content.

Use of encrypted secure transmission between the forwarding platform and a node in the distributed computer system can ensure security of packet transmission between the forwarding platform and the node in the distributed computer system. Therefore, a security basis can be provided for connection control on any node in the distributed computer system only in need of maintaining a domain name of the forwarding platform.

In this embodiment, interaction security is ensured between the user terminal and the forwarding platform through the secure link, and interaction security is ensured between the forwarding platform and the target node in an encrypted secure transmission manner. The encrypted transmission manner may be performing encrypted transmission by using the Secure Sockets Layer (SSL) protocol. In this case, to save the development time of the forwarding platform, a platform having the SSL protocol may be used as the forwarding platform. A Blockchain as a Service (BaaS) platform has the SSL protocol. Therefore, in an implementation, the forwarding platform may be the BaaS platform.

In this embodiment of this application, a security protocol may be established between an agent and the forwarding platform; for example, the SSL protocol is configured on the agent and the forwarding platform, and functions of a plurality of processing units on the target node may be subdivided through the agent; for example, a plurality of processing units for processing different request contents are obtained through subdivision, each processing unit has an interface identifier, and each interface identifier is used for identifying a processing unit, in the target node, that may respond to a request content; for example, an interface identifier is used for identifying a processing unit A responsible for responding to a request content for requesting login, and an interface identifier is used for identifying a processing unit B responsible for responding to a request content for requesting downloading of a picture. Therefore, the agent may be deployed on the target node, so that the forwarding platform exchanges the first encrypted packet with the target node through the agent deployed on the target node, to perform fine control on interfaces of the target node.

To ensure that the forwarding platform can directly transmit the first encrypted packet to a processing unit responsible for responding to the request content included in the first encrypted packet, thereby avoiding a case that the forwarding platform transmits the first encrypted packet to another processing unit and then the another processing unit forwards the first encrypted packet to the processing unit responsible for responding to the request content, and improving processing efficiency of the target node for the first encrypted packet, the address identifier may include a network address of the target node and an interface identifier, of the target node, for responding to the request content, and the forwarding platform may determine, according to the network address, the target node receiving the first encrypted packet, may determine, according to the interface identifier, a processing unit of the target node to which the first encrypted packet is specifically transmitted for processing, that is, determine a processing unit, in the target node, for responding to the request content, and transmit the first encrypted packet to the processing unit.

In this case, if the address identifier is carried in a URL including a domain name, the URL may be in the form of domain name+network address+interface identifier. For example, a URL is www.baas.qq.com/192.168.10.11/login, where www.baas.qq.com is a domain name, 192.168.10.11 is a network address, and login is an interface identifier. Through pre-negotiation between the user terminal and the forwarding platform, the forwarding platform may parse the URL, identify the domain name www.baas.qq.com, the network address 192.168.10.11, and the interface identifier login, then determine, according to whether the identified www.baas.qq.com and the domain name of the forwarding platform are consistent, whether the request packet is transmitted incorrectly, then determine the target node according to 192.168.10.11, and determine, according to login, a port of the target node to which the first encrypted packet is transmitted.

Step S204. The target node decrypts the first encrypted packet to obtain the request content.

It may be seen from the foregoing technical solutions that, if a user terminal needs to perform connection control on a target node in a distributed computer system, the user terminal may establish a secure link through a domain name of a forwarding platform, and transmit a request packet to the forwarding platform from the secure link, where the request packet includes an address identifier of the target node and a request content of the user terminal for the target node. After obtaining the request packet, the forwarding platform may determine, according to the address identifier, the target node, in the distributed computer system, that needs to receive the request content; and encrypt the request content and transmit the encrypted request content to the target node. Encrypted secure transmission is used between the forwarding platform and a node in the distributed computer system. Therefore, when any user terminal performs connection control on the node in the distributed computer system, security can be ensured provided that the user terminal establishes a secure link with the forwarding platform through a domain name of the forwarding platform, thereby implementing connection control on any node in the distributed computer system only in need of maintaining the domain name of the forwarding platform, and reducing maintenance costs and saving network resources while ensuring security, to facilitate application of the distributed computer system.

Figure 3:
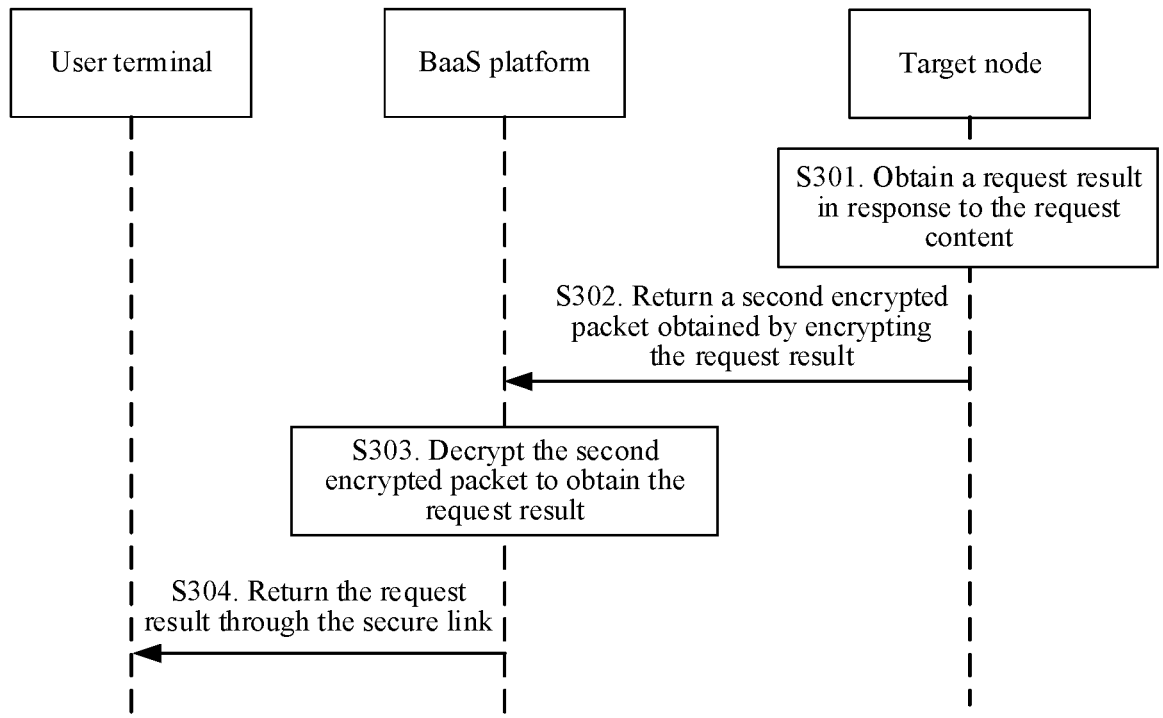
FIG. 3 is a signaling interaction diagram of a node control method in a distributed computer system according to an embodiment of this application.

In this embodiment of this application, after the forwarding platform transmits the first encrypted packet to the target node, the target node may respond to the request content in the first encrypted packet, and then return a request result to the user terminal. Next, a process of returning the request result is described. Referring to FIG. 3, the method further includes the following steps:

Step S301. The target node obtains a request result in response to the request content.

Step S302. The target node returns a second encrypted packet obtained by encrypting the request result to the forwarding platform.

For example, the request content includes a user name and a password, the request content reflects that the user terminal intends to log in through the user name and the password, and therefore the request result obtained by the target node according to the request content may be prompt information indicating whether login is successful.

In this embodiment of this application, a method for encrypting the request result by the target node is the same as a method for encrypting the request content by the forwarding platform.

In this embodiment of this application, a second encrypted packet may alternatively be exchanged between the target node and the forwarding platform through an agent deployed on the target node.

Step S303. The forwarding platform decrypts the second encrypted packet to obtain the request result.

Step S304. The forwarding platform returns the request result to the user terminal through the secure link.

The secure link between the user terminal and the forwarding platform is bidirectional. That is, the user terminal may transmit the request packet to the forwarding platform through the secure link, and correspondingly, the forwarding platform may also return the request result to the user terminal through the secure link.

Encrypted secure transmission is used between the forwarding platform and a node in the distributed computer system, and transmission is performed between the user terminal and the forwarding platform by using the secure link. Therefore, this embodiment may ensure security of the request result in a process of returning the request result to the user terminal by the target node. It can be learned that, in the method provided in this embodiment of this application, establishing the secure link through the domain name of the forwarding platform may ensure security of connection control, thereby implementing connection control on any node in the distributed computer system only in need of maintaining the domain name of the forwarding platform, and reducing maintenance costs and saving network resources while ensuring security, to facilitate application of the distributed computer system.

A node control method in a distributed computer system provided in an embodiment of this application is described below with reference to an actual application scenario. In the application scenario, when browsing a website on a user terminal, a user may need to log in to the website. In this case, the user may intend to enter a login page of the website to input a user name and a password, and a process of requesting to log in to the page through the user terminal by the user is node control.

Figure 4:
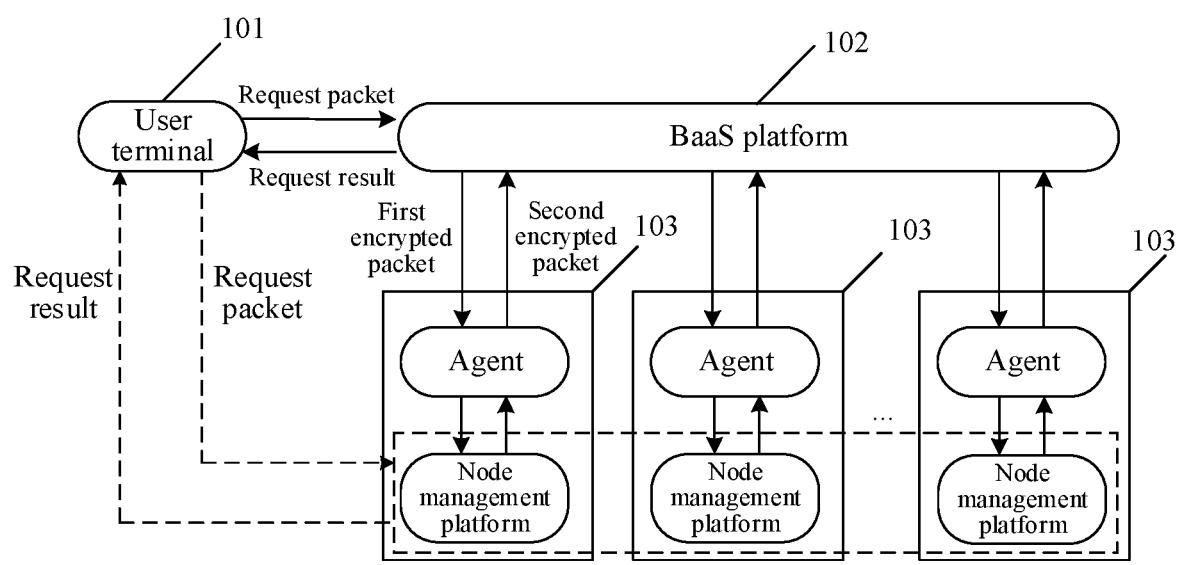
FIG. 4 is an exemplary diagram of a system architecture to which a node control method in a distributed computer system is applicable according to an embodiment of this application.
Figure 5:
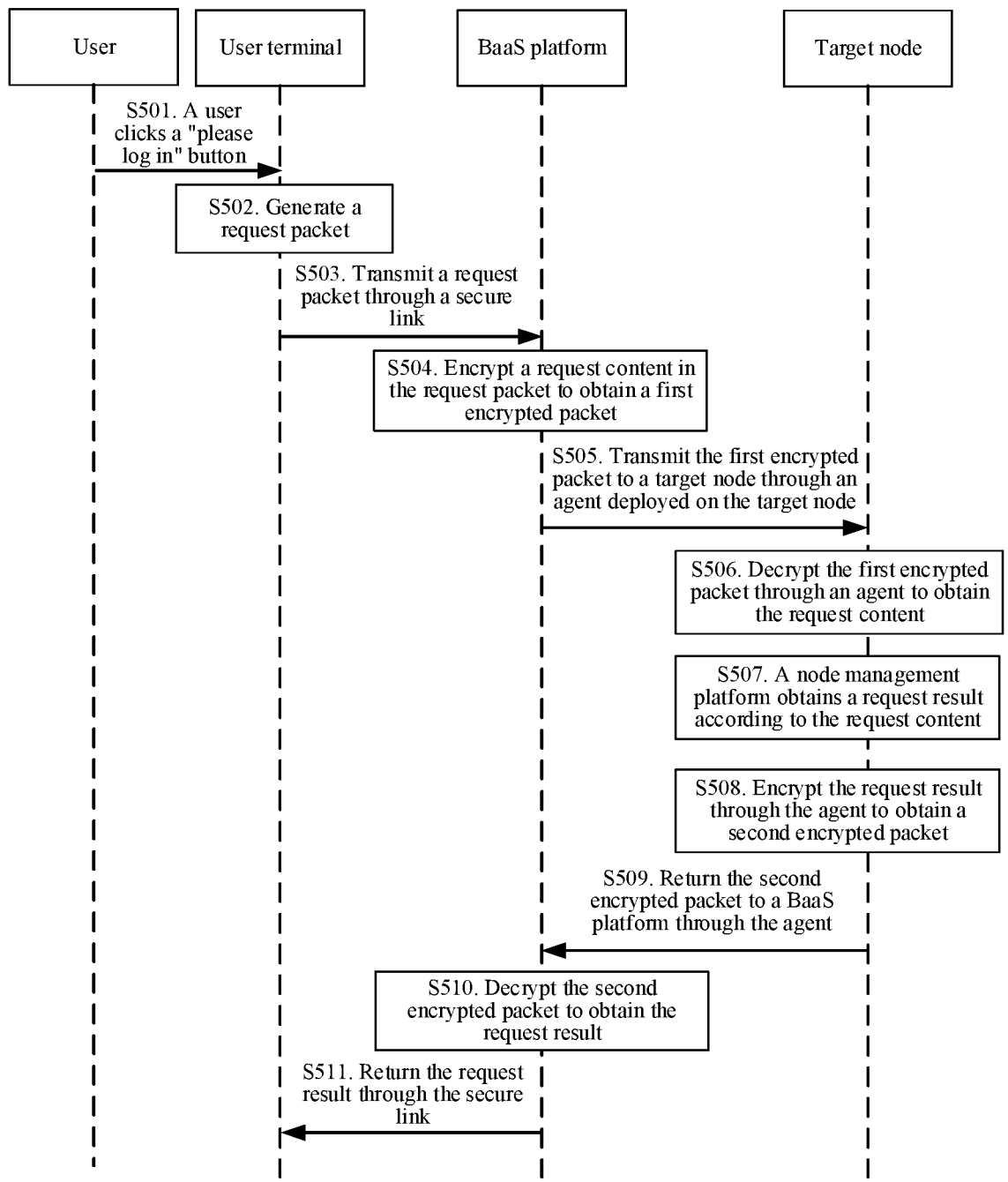
FIG. 5 is a signaling interaction diagram of a node control method in a distributed computer system according to an embodiment of this application.

In an implementation, a system architecture shown in FIG. 4 may be applied to the foregoing application scenario, and the system architecture includes a user terminal 101, a forwarding platform 102, and a plurality of nodes 103 in a distributed computer system, where an agent and a node management platform are deployed on each node 103, and the forwarding platform 102 is a blockchain-as-a-service (BaaS) platform. Blockchain-as-a-service (BaaS) is the third-party creation and management of cloud-based networks for building blockchain applications. These applications based on blockchain technology has moved well beyond its original use in cryptocurrency transactions and has broadened to address secure transactions of all kinds.

Specifically, the node control method in a distributed computer system includes the following steps:

Step S501. A user clicks a "please log in" button.

Step S502. A user terminal generates a request packet in response to an operation of the user.

Step S503. The user terminal transmits the request packet to a BaaS platform through a secure link.

The secure link is established through a domain name of the BaaS platform, and the request packet includes an address identifier of a target node in the distributed computer system and a request content of the user terminal for the target node. The request content embodies that the user terminal requests to enter a login page of a website.

Step S504. The BaaS platform encrypts the request content in the request packet to obtain a first encrypted packet.

Step S505. The BaaS platform transmits the first encrypted packet to the target node through an agent deployed on the target node.

Step S506. The target node decrypts the first encrypted packet through the agent to obtain the request content.

Step S507. A node management platform on the target node obtains a request result according to the request content.

The request result may include entering a login page of a website.

Step S508. The target node encrypts the request result through the agent to obtain a second encrypted packet.

Step S509. The target node returns the second encrypted packet to the BaaS platform through the agent.

Step S510. The BaaS platform decrypts the second encrypted packet to obtain the request result.

Step S511. The BaaS platform returns the request result to the user terminal through the secure link.

It may be seen from FIG. 4 that, in a conventional node control method, a user terminal directly transmits a request packet to a node management platform on a node, and the node management platform on the node directly transmits a request result to the user terminal, as shown by dashed lines in FIG. 4. However, to ensure security of transmission, one domain name needs to be allocated to each node, and consequently domain name maintenance costs are excessively high. However, in the method provided in this embodiment of this application, if a user terminal needs to perform connection control on a target node in a distributed computer system, the user terminal may establish a secure link through a domain name of a forwarding platform, and transmit a request packet to the forwarding platform from the secure link, where the request packet includes an address identifier of the target node and a request content of the user terminal for the target node. After obtaining the request packet, the forwarding platform may determine, according to the address identifier, the target node, in the distributed computer system, that needs to receive the request content; and encrypt the request content and transmit the encrypted request content to the target node. After the target node obtains the request result, the target node encrypts the request result to obtain the second encrypted packet, and returns the second encrypted packet to the forwarding platform. The forwarding platform returns the request result obtained through decryption to the user terminal through the secure link. Encrypted secure transmission is used between the forwarding platform and a node in the distributed computer system. Therefore, when any user terminal performs connection control on the node in the distributed computer system, security of connection control can be ensured provided that the user terminal establishes a secure link with the forwarding platform through a domain name of the forwarding platform, thereby implementing connection control on any node in the distributed computer system only in need of maintaining the domain name of the forwarding platform, and reducing maintenance costs and saving network resources while ensuring security, to facilitate application of the distributed computer system.

Figure 6A:
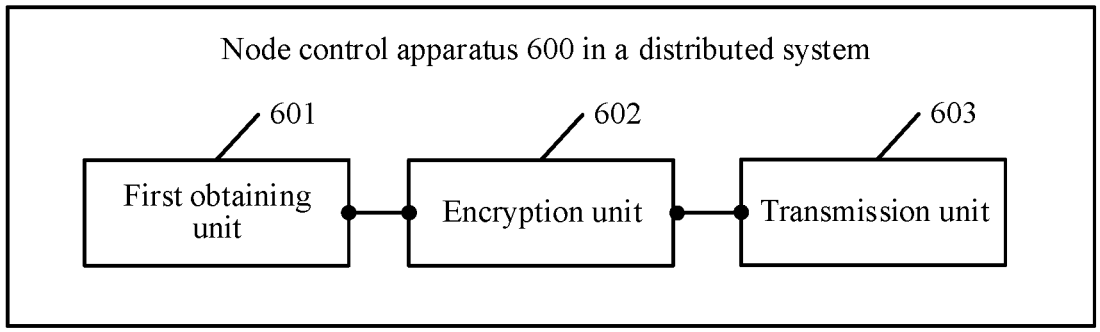
FIG. 6a is a structural diagram of a node control apparatus in a distributed computer system according to an embodiment of this application.

Based on the node control method in a distributed computer system provided in the foregoing embodiment, an embodiment of this application further provides a node control apparatus in a distributed computer system, and the apparatus may be the forwarding platform in the foregoing node control method. Referring to FIG. 6a, the apparatus includes a first obtaining unit 601, an encryption unit 602, and a transmission unit 603.

The first obtaining unit 601 is configured to obtain, through a secure link, a request packet transmitted by a user terminal, the secure link being established between the user terminal and the apparatus through a domain name of the apparatus, and the request packet including an address identifier of a target node in the distributed computer system and a request content of the user terminal for the target node;

the encryption unit 602 is configured to encrypt the request content to obtain a first encrypted packet; and the transmission unit 603 is configured to transmit the first encrypted packet to the target node according to the address identifier.

Figure 6B:
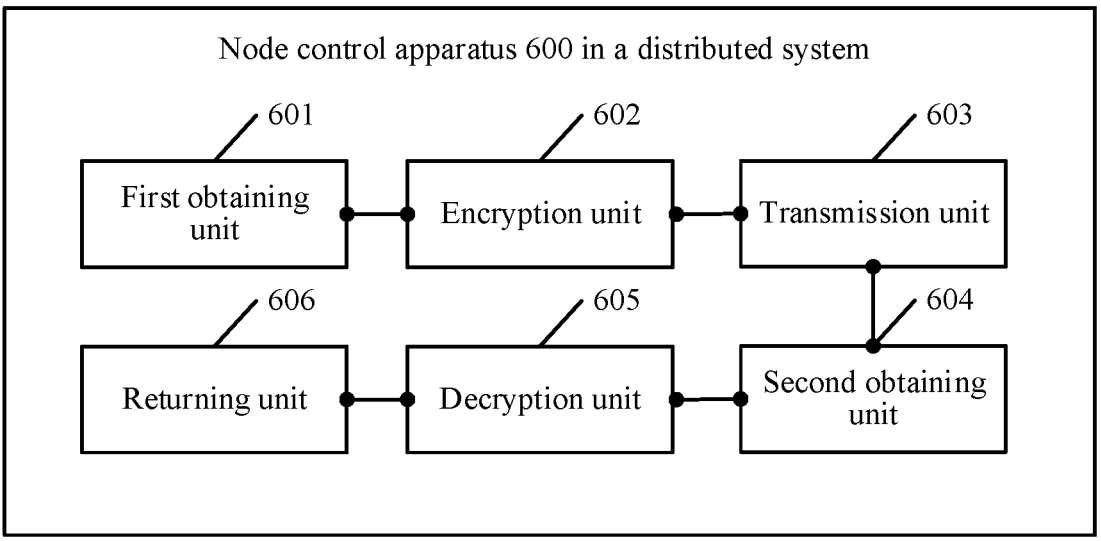
FIG. 6b is a structural diagram of a node control apparatus in a distributed computer system according to an embodiment of this application.

In a possible implementation, referring to FIG. 6b, the apparatus further includes a second obtaining unit 604, a decryption unit 605, and a returning unit 606.

The second obtaining unit 604 is configured to obtain a second encrypted packet returned by the target node, where the second encrypted packet is obtained by encrypting a request result by the target node, and the request result is obtained by the target node in response to the request content;

the decryption unit 605 is configured to decrypt the second encrypted packet to obtain the request result; and the returning unit 606 is configured to return the request result to the user terminal through the secure link.

In a possible implementation, when determining that a user identifier has permission to access the target node, the encryption unit 602 performs the operation of encrypting the request content to obtain a first encrypted packet.

In a possible implementation, the address identifier includes a network address of the target node and an interface identifier, of the target node, used for responding to the request content. The transmission unit 603 is configured to determine, according to the network address, the target node receiving the first encrypted packet, determine, according to the interface identifier, a processing unit, in the target node, used for responding to the request content, and transmit the first encrypted packet to the processing unit.

In a possible implementation, the address identifier is carried in a URL including the domain name.

Figure 7:
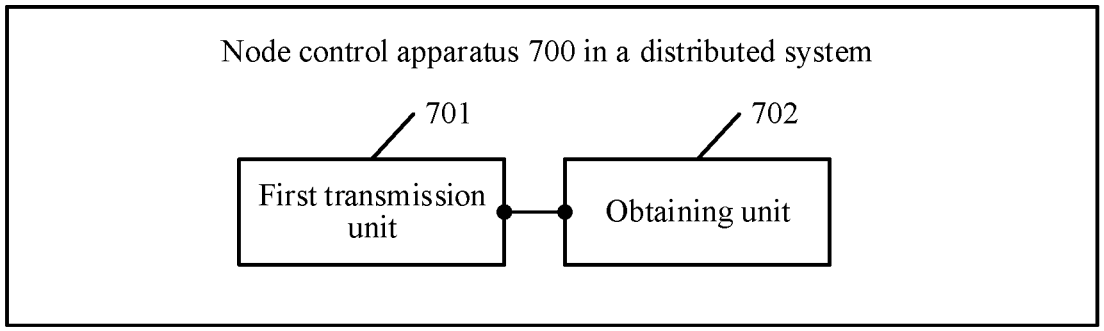
FIG. 7 is a structural diagram of a node control apparatus in a distributed computer system according to an embodiment of this application.

An embodiment of this application further provides a node control apparatus in a distributed computer system, and the apparatus may be the user terminal in the foregoing node control method. Referring to FIG. 7, the apparatus includes a first transmission unit 701 and an obtaining unit 702.

The first transmission unit 701 is configured to transmit a request packet to a forwarding platform through a secure link, the secure link being established between the apparatus and the forwarding platform through a domain name of the forwarding platform, and the request packet including an address identifier of a target node in the distributed computer system and a request content of the apparatus for the target node; and the obtaining unit 702 is configured to obtain, through the secure link, a request result returned by the forwarding platform, the request result being obtained by the target node in response to the request content.

In a possible implementation, the request packet further includes a user identifier of the apparatus, and the user identifier is used for identifying a permission relationship between the apparatus and the target node.

In a possible implementation, the address identifier includes a network address of the target node and an interface identifier, of the target node, used for responding to the request content.

In a possible implementation, the address identifier is carried in a URL including the domain name.

Figure 8A:
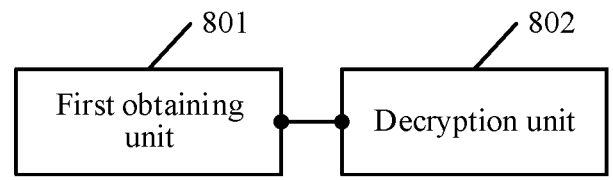
FIG. 8a is a structural diagram of a node control apparatus in a distributed computer system according to an embodiment of this application.

An embodiment of this application further provides a node control apparatus in a distributed computer system. Referring to FIG. 8a, the apparatus includes a first obtaining unit 801 and a decryption unit 802.

The first obtaining unit 801 is configured to obtain a first encrypted packet transmitted by a forwarding platform, the first encrypted packet being obtained by encrypting a request content by the forwarding platform, and the request content being carried in a request packet transmitted by a user terminal through a secure link between the user terminal and the forwarding platform; and the decryption unit 802 is configured to decrypt the first encrypted packet to obtain the request content.

Figure 8B:
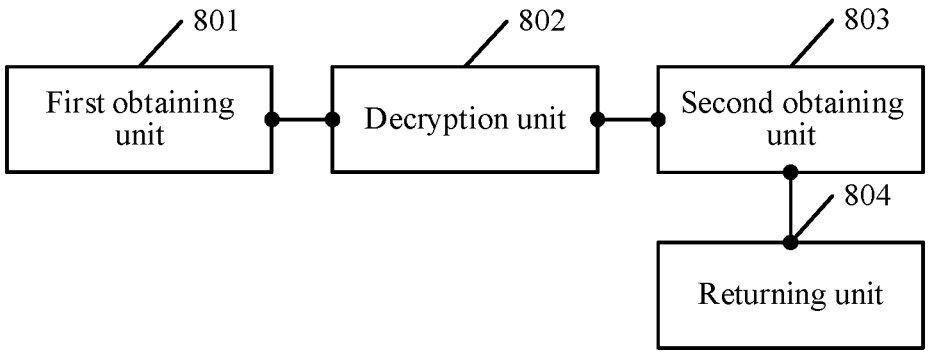
FIG. 8b is a structural diagram of a node control apparatus in a distributed computer system according to an embodiment of this application.

In a possible implementation, referring to FIG. 8b, the apparatus further includes a second obtaining unit 803 and a returning unit 804.

The second obtaining unit 803 is configured to obtain a request result in response to the request content; and the returning unit 804 is configured to return a second encrypted packet obtained by encrypting the request result to the forwarding platform.

In a possible implementation, the apparatus exchanges the first encrypted packet and the second encrypted packet with the forwarding platform through an agent deployed on the apparatus.

Figure 9:
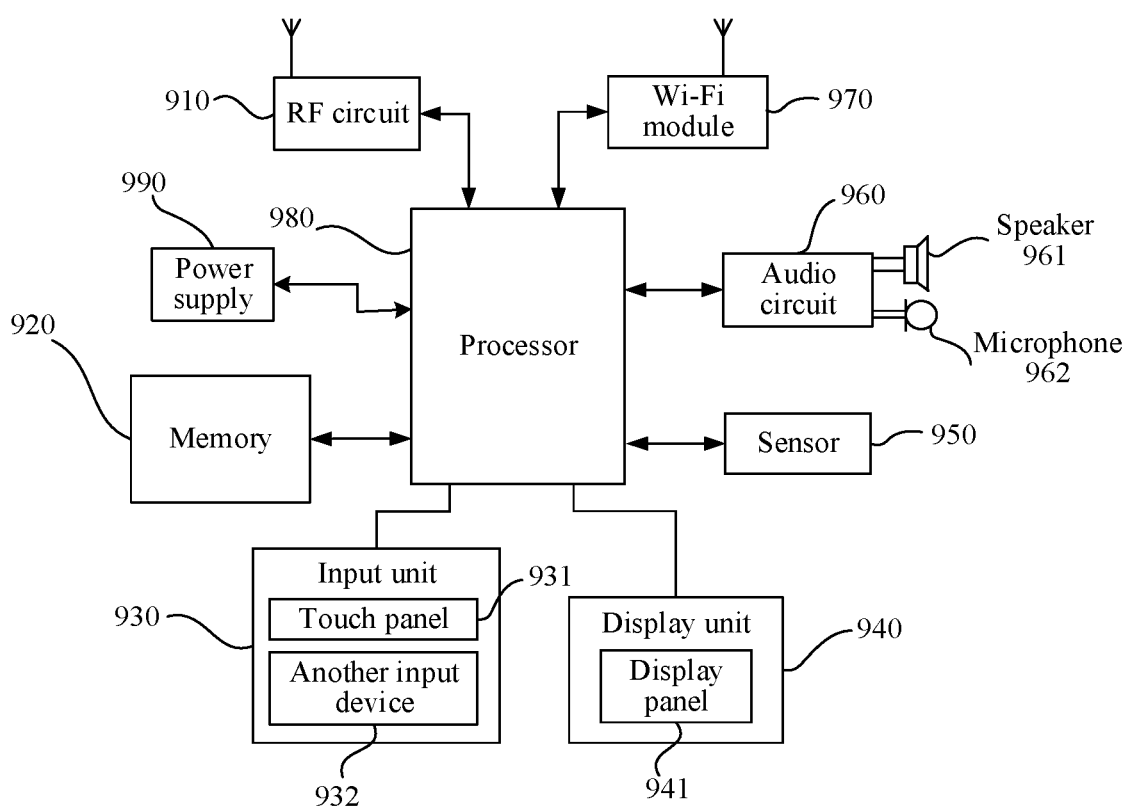
FIG. 9 is a structural diagram of a node control device used in a distributed computer system according to an embodiment of this application.

An embodiment of this application further provides a node control device used in a distributed computer system, and the node control device used in a distributed computer system is described below with reference to an accompanying drawing. Referring to FIG. 9, an embodiment of this application provides a node control device 900 used in a distributed computer system. The device 900 may be a terminal device, and the terminal device may be any terminal device including a mobile phone, a tablet computer, a personal digital assistant (PDA), a point of sales (POS), an on-board computer, and the like. The terminal device being a mobile phone is used as an example for description in this embodiment of this application, as shown in FIG. 9.

FIG. 9 is a block diagram of a part of a structure of the mobile phone according to this embodiment of this application. Referring to FIG. 9, the mobile phone includes components such as: a radio frequency (RF) circuit 910, a memory 920, an input unit 930, a display unit 940, a sensor 950, an audio circuit 960, a wireless fidelity (Wi-Fi) module 970, a processor 980, and a power supply 990. A person skilled in the art may understand that the structure of the mobile phone shown in FIG. 9 does not constitute a limitation on the mobile phone, and the mobile phone may include more components or fewer components than those shown in the figure, or some components may be combined, or a different component deployment may be used.

The following makes a specific description of components of the mobile phone with reference to FIG. 9.

The RF circuit 910 may be configured to receive and transmit signals during an information receiving and transmitting process or a call process. Specifically, the RF circuit receives downlink information from a base station, then transmits the downlink information to the processor 980 for processing, and transmits uplink data of the mobile phone to the base station. Generally, the RF circuit 910 includes, but is not limited to, an antenna, at least one amplifier, a transceiver, a coupler, a low noise amplifier (LNA), a duplexer, and the like. In addition, the RF circuit 910 may further communicate with a network and another device through wireless communication. The wireless communication may use any communication standard or protocol, including, but not limited to a Global System for Mobile communications (GSM), a general packet radio service (GPRS), code division multiple access (CDMA), wideband code division multiple access (WCDMA), Long Term Evolution (LTE), an email, a short messaging service (SMS), and the like.

The memory 920 may be configured to store a software program and module. The processor 980 runs the software program and module stored in the memory 920, to implement various functional applications and data processing of the mobile phone. The memory 920 may mainly include a program storage area and a data storage area. The program storage area may store an operating system, an application program required by at least one function (such as a sound playback function and an image display function), and the like. The data storage area may store data (such as audio data and an address book) created according to the use of the mobile phone, and the like. In addition, the memory 920 may include a high speed random access memory, and may further include a nonvolatile memory, such as at least one magnetic disk storage device, a flash memory device, or other volatile solid-state storage devices.

The input unit 930 may be configured to receive input digit or character information, and generate a keyboard signal input related to the user setting and function control of the mobile phone. Specifically, the input unit 930 may include a touch panel 931 and another input device 932. The touch panel 931 is also referred to as a touchscreen, may collect a touch operation that is performed by a user on or near the touch panel 931 (for example, an operation that is performed by a user by using any appropriate object or accessory such as a finger or a stylus on or near the touch panel 931), and drive a corresponding connection apparatus according to a preset program. Optionally, the touch panel 931 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 980. In addition, the touch controller can receive a command transmitted by the processor 980 and execute the command. In addition, the touch panel 931 may be implemented by using various types, such as a resistive type, a capacitance type, an infrared type, and a surface acoustic wave type. In addition to the touch panel 931, the input unit 930 may further include the another input device 932. Specifically, the another input device 932 may include, but is not limited to, one or more of a physical keyboard, a functional key (such as a volume control key or a switch key), a track ball, a mouse, and a joystick.

The display unit 940 may be configured to display information inputted by the user or information provided for the user, and various menus of the mobile phone. The display unit 940 may include a display panel 941. Optionally, the display panel 941 may be configured in the form of a liquid crystal display (LCD), an organic light-emitting diode (OLED), or the like. Further, the touch panel 931 may cover the display panel 941. After detecting a touch operation on or near the touch panel 931, the touch panel transfers the touch operation to the processor 980, to determine a type of a touch event. Then, the processor 980 provides a corresponding visual output on the display panel 941 according to the type of the touch event. Although in FIG. 9, the touch panel 931 and the display panel 941 are used as two separate parts to implement input and output functions of the mobile phone, in some embodiments, the touch panel 931 and the display panel 941 may be integrated to implement the input and output functions of the mobile phone.

The mobile phone may further include at least one sensor 950 such as an optical sensor, a motion sensor, and other sensors. Specifically, the optical sensor may include an ambient light sensor and a proximity sensor. The ambient light sensor may adjust luminance of the display panel 941 according to brightness of the ambient light. The proximity sensor may switch off the display panel 941 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 960, a speaker 961, and a microphone 962 may provide audio interfaces between a user and the mobile phone. The audio circuit 960 may convert received audio data into an electrical signal and transmit the electrical signal to the speaker 961. The speaker 961 converts the electrical signal into a sound signal for output. On the other hand, the microphone 962 converts a collected sound signal into an electrical signal. The audio circuit 960 receives the electrical signal, converts the electrical signal into audio data, and outputs the audio data to the processor 980 for processing. Then, the processor transmits the audio data to, for example, another mobile phone by using the RF circuit 910, or outputs the audio data to the memory 920 for further processing.

Wi-Fi belongs to a short distance wireless transmission technology. The mobile phone may help, by using the Wi-Fi module 970, a user to receive and transmit an email, browse a web page, access stream media, and the like. This provides wireless broadband Internet access for the user. Although FIG. 9 shows the Wi-Fi module 970, it may be understood that the Wi-Fi module is not a necessary component of the mobile phone, and the Wi-Fi module may be omitted as required provided that the scope of the essence of the present disclosure is not changed.

The processor 980 is a control center of the mobile phone, and is connected to various parts of the entire mobile phone by using various interfaces and lines. By running or executing a software program and/or module stored in the memory 920, and invoking data stored in the memory 920, the processor executes various functions of the mobile phone and performs data processing, thereby monitoring the entire mobile phone. Optionally, the processor 980 may include one or more processing units. In an embodiment of this application, the processor 980 may integrate an application processor and a modem processor. The application processor mainly processes an operating system, a user interface, an application, and the like. The modem processor mainly processes wireless communication. In another embodiment of this application, the foregoing modem processor may alternatively not be integrated into the processor 980.

The mobile phone further includes the power supply 990 (such as a battery) for supplying power to the components. In this embodiment of this application, the power supply may be logically connected to the processor 980 by using a power management system, thereby implementing functions such as charging, discharging, and power consumption management by using the power management system.

Although not shown in the figure, the mobile phone may further include a camera, a Bluetooth module, and the like, which are not further described herein.

In an embodiment of this application, the processor 980 included in the terminal device further has the following functions:

obtaining, through a secure link, a request packet transmitted by a user terminal, the secure link being established between the user terminal and the forwarding platform through a domain name of the forwarding platform, and the request packet including an address identifier of a target node in the distributed computer system and a request content of the user terminal for the target node;

encrypting the request content to obtain a first encrypted packet; and transmitting the first encrypted packet to the target node according to the address identifier.

In another embodiment of this application, the processor 980 included in the terminal device has the following functions:

transmitting a request packet to a forwarding platform through a secure link, the secure link being established between the user terminal and the forwarding platform through a domain name of the forwarding platform, and the request packet including an address identifier of a target node in the distributed computer system and a request content of the user terminal for the target node; and obtaining, through the secure link, a request result returned by the forwarding platform, the request result being obtained by the target node in response to the request content.

In another embodiment of this application, the processor 980 included in the terminal device has the following functions:

obtaining a first encrypted packet transmitted by a forwarding platform, the first encrypted packet being obtained by encrypting a request content by the forwarding platform, and the request content being carried in a request packet transmitted by a user terminal through a secure link between the user terminal and the forwarding platform; and decrypting the first encrypted packet to obtain the request content.

Figure 10:
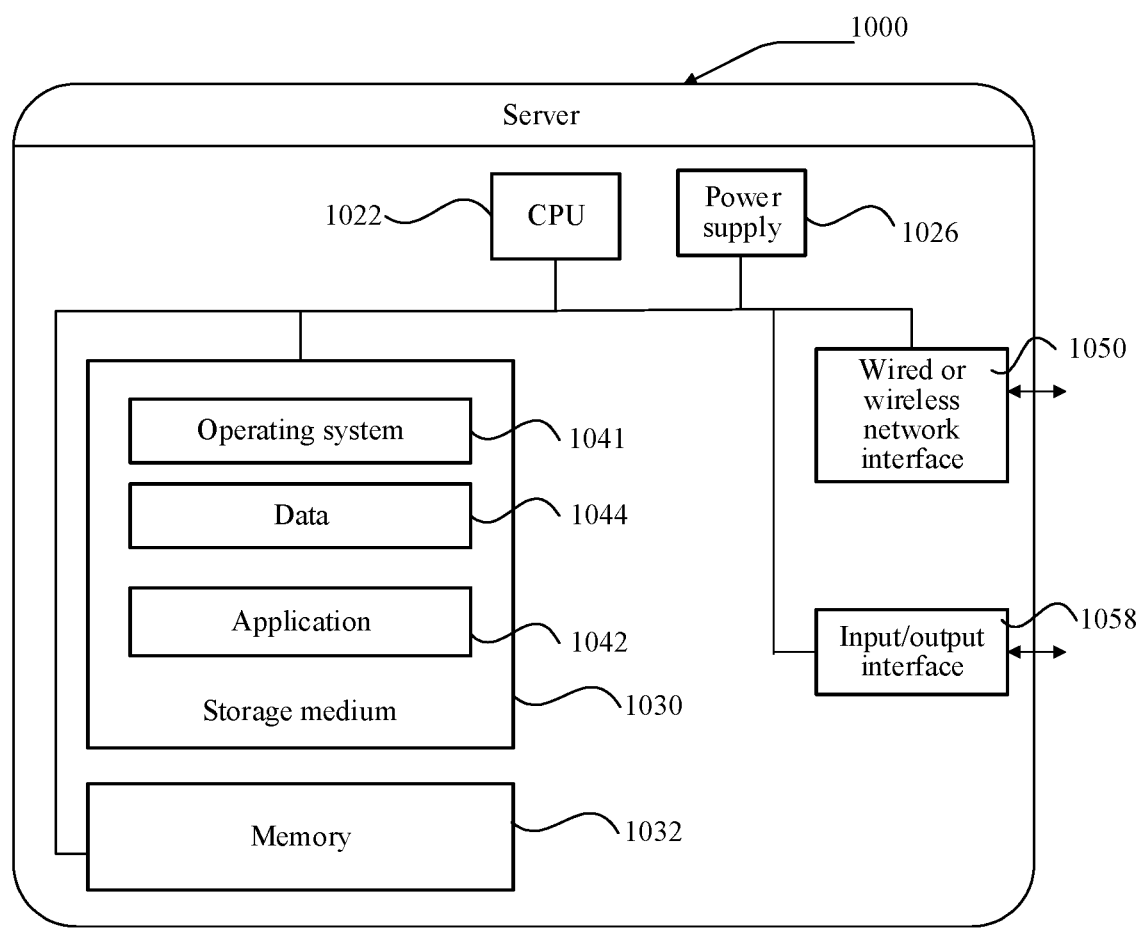
FIG. 10 is a structural diagram of a node control device used in a distributed computer system according to an embodiment of this application.

Referring to FIG. 10, an embodiment of this application provides a node control device 1000 used in a distributed computer system. The device 1000 may be a server, and may vary considerably depending on configuration or performance, and may include one or more central processing units (CPU) 1022 (for example, one or more processors), a memory 1032, and one or more storage media 1030 (for example, one or more massive storage devices) storing an application program 1042 or data 1044. The memory 1032 and the storage medium 1030 may perform transient storage or permanent storage. A program stored in the storage medium 1030 may include one or more modules (which are not marked in the figure), and each module may include a series of instruction operations on the server. Furthermore, the CPUs 1022 may be configured to: communicate with the storage media 1030, and perform, on the node control device 1000 used in a distributed computer system, a series of instruction operations in the storage medium 1030.

The node control device 1000 used in a distributed computer system may further include one or more power supplies 1026, one or more wired or wireless network interfaces 1050, one or more input/output interfaces 1058, and/or one or more operating systems 1041, for example, Windows Server™, Mac OS X™, Unix™, Linux™, or FreeBSD™.

The steps performed by the server in the foregoing embodiment may be based on the server structure shown in FIG. 10.

In an embodiment of this application, the CPU 1022 is configured to perform the following steps:

obtaining, through a secure link, a request packet transmitted by a user terminal, the secure link being established between the user terminal and the forwarding platform through a domain name of the forwarding platform, and the request packet including an address identifier of a target node in the distributed computer system and a request content of the user terminal for the target node;

encrypting the request content to obtain a first encrypted packet; and transmitting the first encrypted packet to the target node according to the address identifier.

In another embodiment of this application, the CPU 1022 is configured to perform the following steps:

obtaining a first encrypted packet transmitted by a forwarding platform, the first encrypted packet being obtained by encrypting a request content by the forwarding platform, and the request content being carried in a request packet transmitted by a user terminal through a secure link between the user terminal and the forwarding platform; and decrypting the first encrypted packet to obtain the request content.

An embodiment of this application further provides a computer-readable storage medium, configured to store program code, the program code implementing, when executed by one or more processors, the node control method in a distributed computer system according to the foregoing embodiments.

In the specification and accompanying drawings of this application, the terms "first", "second", "third", "fourth", and so on (if existing) are intended to distinguish between similar objects rather than describe a specific order or sequence. It is to be understood that, data used in this way is interchangeable in a suitable case, so that the embodiments of this application described herein can be implemented, for example, in a sequence other than the sequences depicted or described herein. In addition, the terms "include", "comprise" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

It is to be understood that, in this application, "at least one piece (item)" refers to one or more, and "a plurality of" refers to two or more. "And/or" is used for describing an association relationship of associated objects and represents that three relationships may exist. For example, "A and/or B" may represent the following three cases: only A exists, only B exists, and both A and B exist, where A or B may be singular or plural. The character "/" in this specification generally indicates an "or" relationship between the associated objects. "At least one item (piece) of the following" or a similar expression means that any combination of these items includes any combination of a single item (piece) or a plurality of items (pieces). For example, at least one item (piece) of a, b, or c may represent: a, b, c, "a and b", "a and c", "b and c", or "a and b and c", where a, b, or c may be singular or plural.

In this application, terms like "module" or "unit" refer to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. In the embodiments provided in this application, it is to be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatus or units may be implemented in electronic, mechanical, or other forms.

The units described as separate parts can or cannot be physically separate. Parts displayed as units may or may not be physical units, and may be located in one position, or may be distributed on a plurality of network units. Some or all of the units may be selected according to actual requirements to achieve the objectives of the solutions in the embodiments.

In addition, functional units in the embodiments of this application may be integrated into one processing unit, or each of the units may exist alone physically, or two or more units are integrated into one unit. The foregoing integrated unit may be implemented in the form of hardware, or may be implemented in the form of a software function unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing embodiments are merely provided for describing the technical solutions of this application, but not intended to limit this application. A person of ordinary skill in the art shall understand that although this application has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of this application.

What is claimed is:

1. A node control method in a distributed computer system, comprising:

establishing, by a forwarding platform, a secure link with a user terminal through a domain name of the forwarding platform;

obtaining, by the forwarding platform through the secure link, a request packet transmitted by the user terminal, and the request packet comprising an address identifier of a target node in the distributed computer system and a request content of the user terminal for the target node, wherein the address identifier comprises a network address of the target node and an interface identifier, of the target node, used for responding to the request content;

encrypting, by the forwarding platform, the request content to obtain a first encrypted packet; and transmitting, by the forwarding platform, the first encrypted packet to a port of the target node according to the address identifier and the interface identifier.

2. The method according to claim 1, wherein after the transmitting, by the forwarding platform, the first encrypted packet to the target node according to the address identifier, the method further comprises:

obtaining, by the forwarding platform, a second encrypted packet returned by the target node, wherein the second encrypted packet is obtained by encrypting a request result by the target node in response to the request content;

decrypting, by the forwarding platform, the second encrypted packet to obtain the request result; and returning, by the forwarding platform, the request result to the user terminal through the secure link.

3. The method according to claim 2, wherein the target node exchanges the first encrypted packet and the second encrypted packet with the forwarding platform through an agent deployed on the target node.

4. The method according to claim 1, wherein the request packet further comprises a user identifier of the user terminal, and the method further comprises:

performing, by the forwarding platform when determining that the user identifier has permission to access the target node, the operation of encrypting the request content to obtain a first encrypted packet.

5. The method according to claim 4, wherein the user identifier of the user terminal is used for identifying a permission relationship between the user terminal and the target node.

6. The method according to claim 1, wherein the transmitting, by the forwarding platform, the first encrypted packet to the target node according to the address identifier comprises:

determining, by the forwarding platform according to the network address, the target node receiving the first encrypted packet;

determining, by the forwarding platform according to the interface identifier, a processing unit, in the target node, used for responding to the request content; and transmitting, by the forwarding platform, the first encrypted packet to the processing unit.

7. The method according to claim 1, wherein the address identifier is carried in a uniform resource locator (URL) comprising the domain name.

8. A computing device acting as a forwarding platform used in a distributed computer system, comprising a processor and a memory, the memory being configured to store program code and transmit the program code to the processor; and the processor being configured to execute the program code and perform a plurality of operations including:

establishing, by the forwarding platform, a secure link with a user terminal through a domain name of the forwarding platform;

obtaining, by the forwarding platform through the secure link, a request packet transmitted by the user terminal, and the request packet comprising an address identifier of a target node in the distributed computer system and a request content of the user terminal for the target node, wherein the address identifier comprises a network address of the target node and an interface identifier, of the target node, used for responding to the request content;

encrypting, by the forwarding platform, the request content to obtain a first encrypted packet; and transmitting, by the forwarding platform, the first encrypted packet to a port of the target node according to the address identifier and the interface identifier.

9. The computing device according to claim 8, wherein the plurality of operations further comprises:

after transmitting, by the forwarding platform, the first encrypted packet to the target node according to the address identifier:

obtaining, by the forwarding platform, a second encrypted packet returned by the target node, wherein the second encrypted packet is obtained by encrypting a request result by the target node in response to the request content;

decrypting, by the forwarding platform, the second encrypted packet to obtain the request result; and returning, by the forwarding platform, the request result to the user terminal through the secure link.

10. The computing device according to claim 9, wherein the target node exchanges the first encrypted packet and the second encrypted packet with the forwarding platform through an agent deployed on the target node.

11. The computing device according to claim 8, wherein the request packet further comprises a user identifier of the user terminal, the plurality of operations further comprises:

performing, by the forwarding platform when determining that the user identifier has permission to access the target node, the operation of encrypting the request content to obtain a first encrypted packet.

12. The computing device according to claim 11, wherein the user identifier of the user terminal is used for identifying a permission relationship between the user terminal and the target node.

13. The computing device according to claim 8, wherein the transmitting, by the forwarding platform, the first encrypted packet to the target node according to the address identifier comprises:

determining, by the forwarding platform according to the network address, the target node receiving the first encrypted packet;

determining, by the forwarding platform according to the interface identifier, a processing unit, in the target node, used for responding to the request content; and transmitting, by the forwarding platform, the first encrypted packet to the processing unit.

14. The computing device according to claim 8, wherein the address identifier is carried in a uniform resource locator (URL) comprising the domain name.

15. A non-transitory computer-readable storage medium, configured to store program code, the program code, when executed by one or more processors of a forwarding platform, implementing a node control method in a distributed computer system by performing a plurality of operations including:

establishing, by the forwarding platform, a secure link with a user terminal through a domain name of the forwarding platform;

obtaining, by the forwarding platform through the secure link, a request packet transmitted by the user terminal, and the request packet comprising an address identifier of a target node in the distributed computer system and a request content of the user terminal for the target node, wherein the address identifier comprises a network address of the target node and an interface identifier, of the target node, used for responding to the request content;

encrypting, by the forwarding platform, the request content to obtain a first encrypted packet; and transmitting, by the forwarding platform, the first encrypted packet to a port of the target node according to the address identifier and the interface identifier.

16. The non-transitory computer-readable storage medium according to claim 15, wherein the plurality of operations further comprises:

after transmitting, by the forwarding platform, the first encrypted packet to the target node according to the address identifier:

obtaining, by the forwarding platform, a second encrypted packet returned by the target node, wherein the second encrypted packet is obtained by encrypting a request result by the target node in response to the request content;

decrypting, by the forwarding platform, the second encrypted packet to obtain the request result; and returning, by the forwarding platform, the request result to the user terminal through the secure link.

17. The non-transitory computer-readable storage medium according to claim 16, wherein the target node exchanges the first encrypted packet and the second encrypted packet with the forwarding platform through an agent deployed on the target node.

18. The non-transitory computer-readable storage medium according to claim 15, wherein the request packet further comprises a user identifier of the user terminal, the plurality of operations further comprises:

performing, by the forwarding platform when determining that the user identifier has permission to access the target node, the operation of encrypting the request content to obtain a first encrypted packet.

19. The non-transitory computer-readable storage medium according to claim 15, wherein the address identifier comprises a network address of the target node and an interface identifier, of the target node, used for responding to the request content, and the transmitting, by the forwarding platform, the first encrypted packet to the target node according to the address identifier comprises:

determining, by the forwarding platform according to the network address, the target node receiving the first encrypted packet;

determining, by the forwarding platform according to the interface identifier, a processing unit, in the target node, used for responding to the request content; and transmitting, by the forwarding platform, the first encrypted packet to the processing unit.

20. The non-transitory computer-readable storage medium according to claim 15, wherein the address identifier is carried in a uniform resource locator (URL) comprising the domain name.

\* \* \* \* \*